Figure 1:
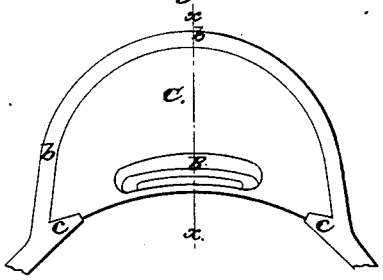
Figure 2:
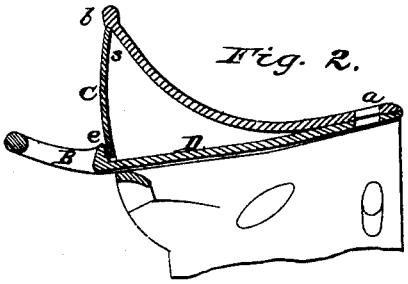

H8682 OR AI 113
38 Saddles, Harness.

A. I. 2

Mardock & Kellar,

Saddle Tree,

№ 113. A.I. Patented Aug. 1, 1854.

N. PETERS, PHOTO-LITHOGRAPHER, WASHINGTON, D. C.